(12) United States Patent
van Schelven

(10) Patent No.: US 11,410,296 B2
(45) Date of Patent: Aug. 9, 2022

(54) BLISTER-STRIP INSPECTION DEVICE

(71) Applicant: BLISTER PARTNERS HOLDING BV, The Hague (NL)

(72) Inventor: Gijsbert Olivier van Schelven, AJ The Hague (NL)

(73) Assignee: BLISTER PARTNERS HOLDING BV, The Hague (NL)

( * ) Notice: Subject to any disclaimer, the term of this patent is extended or adjusted under 35 U.S.C. 154(b) by 0 days.

(21) Appl. No.: 15/572,031

(22) PCT Filed: May 4, 2016

(86) PCT No.: PCT/EP2016/060044
§ 371 (c)(1),
(2) Date: Nov. 6, 2017

(87) PCT Pub. No.: WO2016/184689
PCT Pub. Date: Nov. 24, 2016

(65) Prior Publication Data
US 2018/0144455 A1    May 24, 2018

(30) Foreign Application Priority Data
May 18, 2015 (DE) ............ 10 2015 107 730.2

(51) Int. Cl.
*G06K 9/00* (2022.01)
*G06T 7/00* (2017.01)
(Continued)

(52) U.S. Cl.
CPC ......... *G06T 7/001* (2013.01); *G01N 21/8851* (2013.01); *G01N 21/90* (2013.01); *G01N 21/9508* (2013.01)

(58) Field of Classification Search
CPC combination set(s) only.
See application file for complete search history.

(56) References Cited

U.S. PATENT DOCUMENTS

| 5,363,968 | A | * | 11/1994 | Soloman | ........... B07C 5/36 198/725 |
| 6,330,351 | B1 | | 12/2001 | Yasunaga | |
| 9,626,589 | B1 | * | 4/2017 | Graham | ........... G06V 10/24 |
| 2007/0000805 | A1 | | 1/2007 | Van Den Brink | |

(Continued)

FOREIGN PATENT DOCUMENTS

| DE | 10249962 A1 | 5/2004 |
| DE | 202009012784 U1 | 3/2011 |

(Continued)

*Primary Examiner* — Solomon G Bezuayehu
(74) *Attorney, Agent, or Firm* — Myers Bigel, P.A.

(57) ABSTRACT

The invention relates to a blister strip inspection device (10) for sensing blister segments (12) of a blister strip (14), having an image acquisition device (16) which is arranged to capture images of the blister strip (14), wherein the image acquisition device (16) comprises a digital camera (18.1), an advance sensing device (24) for continuously sensing an advance (x) of the blister strip (14), and an evaluating unit (40) which is connected to the digital camera (18.1) and to the advance sensing device (24), and which is configured to automatically perform a method having the following steps: (v) sensing the advance of the blister strip (14), (vi) determining a target time ($t_i$), at least also on the basis of the advance, at which a blister segment (12.$i$) is completely in the field of view (20.1) of the digital camera, and (vii) acquiring an image with the digital camera (18.1) at said target time ($t_i$), wherein the digital camera (18.1) is a video camera which has a field of view (20.1, 20.2) and is formed to capture an image sequence consisting of temporally successive images. According to the invention, it is envisaged that the evaluating unit (40) is configured to automatically (i) determine the target time ($t_i$) at which a blister segment (12.$i$) is completely in the field of view (20.1, 20.2), at least also on the basis of the advance (x), (ii) take an image ($A_i$) from the image sequence such that a monitoring image is generated, (iii) store the monitoring image and (v) repeat steps (i) to (iii) such that a monitoring image sequence is (Continued)

Figure 1:
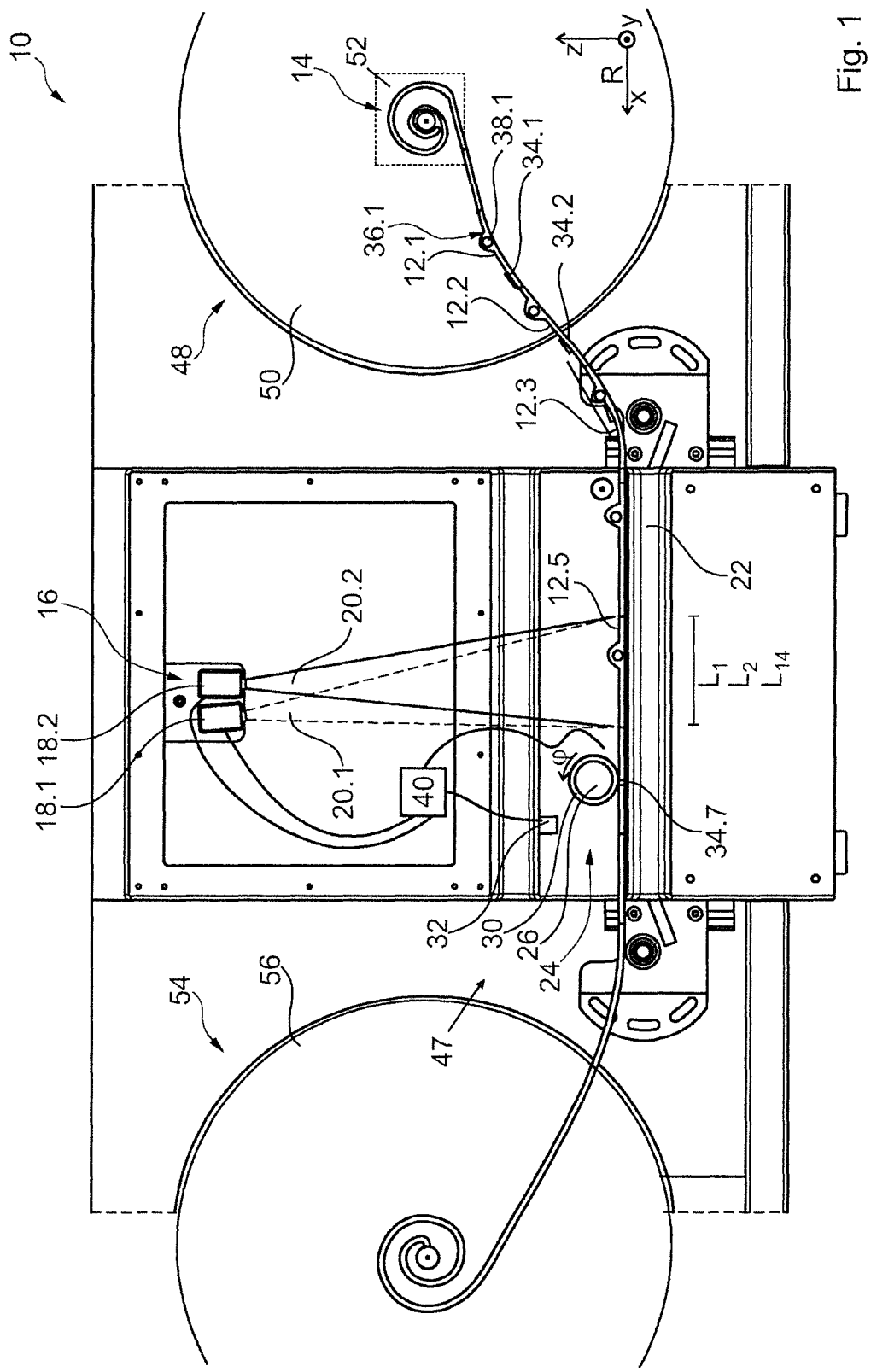

generated, and the evaluating unit (40) is configured to automatically: sense at least one preceding image at a time that lies shortly before the target time ($t_i$) and/or acquire at least one following image (A) at a time that lies shortly after the target time, determine which of the images sufficiently completely contains the greatest portion of a blister segment (12) by means of image recognition, and store said image (A) as a monitoring image.

4 Claims, 2 Drawing Sheets

(51) Int. Cl.
*G01N 21/95* (2006.01)
*G01N 21/88* (2006.01)
*G01N 21/90* (2006.01)

(56) References Cited

U.S. PATENT DOCUMENTS

| | | | |
|---|---|---|---|
| 2008/0047969 A1* | 2/2008 | Farhan | G07F 9/026 221/3 |
| 2012/0296592 A1* | 11/2012 | Luciano, Jr. | A61J 7/0084 702/84 |
| 2013/0282159 A1 | 10/2013 | Morioka et al. | |
| 2014/0091015 A1* | 4/2014 | Kim | B07C 5/00 209/584 |
| 2016/0034773 A1* | 2/2016 | Goncalves | G06K 9/18 382/103 |
| 2016/0104021 A1* | 4/2016 | Negro | G06K 7/1417 235/462.08 |
| 2018/0109737 A1* | 4/2018 | Nakamura | H04N 21/21805 |

FOREIGN PATENT DOCUMENTS

| | | |
|---|---|---|
| EP | 2 789 542 A1 | 10/2014 |
| FR | 2709472 A1 | 3/1995 |
| WO | 2014/119994 A1 | 8/2014 |

\* cited by examiner

BLISTER-STRIP INSPECTION DEVICE

The invention relates to a blister strip inspection device for sensing blister segments of a blister strip according to the preamble of Claim 1.

So-called blister strips, which consist of a row of blister segments, are offered to patients to facilitate the intake of their medicaments. Each blister segment contains a compartment in which a medicament can be received. Moreover, the name of the patient, the contained medicaments and a bar code for identifying the pouch are generally indicated on each blister segment. Such blister strips are manufactured fully or partly automatically and are subject to strict quality control. For each blister strip it is thus documented whether each blister segment contains precisely the right medicaments. Moreover, the content of each blister segment of a blister strip is recorded and documented. This is carried out by means of a blister strip inspection device.

A device for contactlessly recognising the location of wells for product is known from DE 102 49 962 A1, in the case of which it is sensed by means of image recognition if a required position of a well in a blister strip corresponds to the current position. If this is not the case, a feeding device is controlled such that it continues to correctly fill the wells with the medicament. Such a device cannot be used appropriately for blister strips without wells.

A device is known from U.S. Pat. No. 6,330,351 B1 which firstly senses an identification number, then depicts the medicament which is associated with this identification number on a screen, and also captures and depicts an image of the blister pack so that a pharmacist can compare if the medication specified according to the identification number is indeed present in the pouch. Such a system does not allow any automated documentation regarding whether the correct medicaments were contained.

A device for automatically sensing the contents of blister pouches, which works with light of different wavelengths, is known from WO 2014/119994 A1. The contour of the contained medicaments is sensed by light of one wavelength, the colour by another wavelength. From the information from each it is determined if these medicaments should indeed be a component of the blister pouch. Details regarding any documentation are not to be found.

A disadvantage of known blister strip inspection devices is that they only permit automatic documentation to a limited scope.

The underlying problem of the invention is to improve the documentation of the contents of blister strips.

The invention solves the problem by means of a blister strip inspection device with the features from Claim 1.

Advantageously for such a blister strip inspection device, documenting the contents of each blister segment is particularly easily possible. Via the advance sensing device it is thus possible to control the image acquisition device such that it captures precisely one blister segment in each image. A manual check, of whether the images captured by the blister strip inspection device indeed each only show one blister segment and show this blister segment in its entirety, is therefore very easy. In the case of procedural steps, this leads to less complexity and allows a virtually fully automatic mode of operation.

In the context of the present description, a blister strip is in particular understood to mean a longitudinally extended arrangement in a row of successive blister segments. Instead of referring to a blister strip, a tube blister can also be referred to. Instead of referring to a blister segment, a tube blister pouch can also be referred to. It is possible but not necessary for a separation aid to be arranged between two adjacent blister segments, for example a perforation. Preferably, at least one medicament is contained in at least the greater part of the blister segments, in particular in all blister segments. In particular, at least the greater part of the blister segments, in particular each blister segment, comprises a compartment for receiving medicaments, in particular tablets and/or capsules.

Preferably, at least the greater part of the blister segments, in particular each blister segment, has an identifier by means of which it can be deduced what medicament is contained in the compartment. This can occur by the link between the label and the medicament being filed in a data bank. The identifier preferably comprises a barcode and/or a pattern code which could also be described as a 2D barcode.

The feature that the advance sensing device is formed to continuously sense the advance is in particular understood to mean that the advance sensing device can detect a change in position of a maximum of one centimetre, in particular of a maximum of 0.5 centimetres. This ability to detect a change in position is independent of the position of the blister strip along its longitudinal extension.

An advance sensing device, which can only sense whether or not the blister strip has a label at a predetermined point, for example, is not formed to continually sense. In this case, it is possible to sense the position of the blister strip with a high level of accuracy, but this only applies to the points of the blister strip which are directly adjacent to the label. However, this is not a continuous sensing.

It is beneficial if the blister strip has at least two film layers. In particular, the blister strip is formed of a film tube which is laid flat. The two superimposed parts of the tube are preferably connected such that the compartment for the medicament is formed. Naturally, it is also possible that two films are otherwise connected to each other, for example fused or adhesively bonded.

The advance sensing device has an optical advance sensing unit. An optical advance sensing unit is understood to mean a device which automatically determines the advance through a light signal. It is thus possible, and represents a preferable embodiment, that the blister strip has recesses arranged at regular intervals, and the advance sensing unit has an interruption sensor for determining if there is a recess upstream of the interruption sensor. The advance sensing unit is then formed to automatically sense the number of recesses which have passed the interruption sensor, and to calculate the advance from this number.

According to a preferred embodiment, the advance sensing device is formed to sense the advance by means of image correlation. In this case, the advance sensing device comprises a light source, for example a light-emitting diode or a laser, and an image sensor. The displacement of the pattern relative to the image sensor can be determined by means of autocorrelation calculation between images which were captured successively. This principle is known from computer mice. Naturally, it is possible that the advance sensing device makes a determination by means of image correlation and also by means of mechanical contact in order to determine the advance. It is possible, for example, that the advance sensing device determines the respective one advance value by means of two or more methods, and then defines the advance from the advance values, for example by means of averaging.

The image acquisition device comprises a digital camera and the blister strip inspection device has an evaluating unit which is connected to the digital camera and the advance sensing device and is configured to automatically perform a method with the steps of (i) sensing the advance of the blister strip, (ii) determining a target time, at least also on the basis of the advance, at which a blister segment is completely in the field of view of the digital camera, and (iii) acquiring an image with the digital camera at this target time.

Determining the target time can be carried out, for example, by firstly sensing a start label. This can occur with an image acquisition device, for example, or with a sensor of the advance sensing device. It is also possible to manually set the start time or the location of the blister strip relative to the blister strip inspection device. As the length of the blister segments is known, the time at which a blister segment is located precisely in the field of view of the digital camera can be calculated from the respective advance speed.

The feature that the blister segment is located completely in the field of view of the digital camera is understood to mean that such a great scope of the blister segment is arranged in the field of view of the digital camera that the elements of the blister segment which are critical for the evaluation are recognisable. It is possible but not necessary for the blister segment to be arranged entirely in the field of view of the digital camera.

The feature that determining the target time is carried out at least also on the basis of the advance is in particular understood to mean that the advance is factored in when defining the target time. It is possible but not necessary for further criteria to be taken into account when defining the target time. However, if the advance cannot be determined, the time cannot be calculated either.

It is possible but not necessary for the target time to be directly defined. It is thus possible for a trigger pulse to be generated, by means of which the image acquisition device is triggered and captures at least one image. Alternatively or additionally, it is possible for a target time to be expressed in a time unit. It is thus possible, for example, for the evaluating unit to transmit a time at which an image should be captured to the image acquisition device. The image acquisition device in this case features a clock and is configured to trigger at precisely this time.

It is beneficial if the image acquisition device comprises a video camera which has a field of view and is formed to capture an image sequence of temporally successive images, wherein the evaluating unit is configured to automatically determine the target time, at which a blister segment is completely in the field of view, at least also on the basis of the advance, to take an image from the image sequence such that a monitoring image is generated, to store the monitoring image and to repeat said steps such that a monitoring image sequence is generated.

It is beneficial if this monitoring image sequence is linked to an identifier of the blister strip. In this case, it can be ascertained which medicaments are or were contained in the blister strip on the basis of the monitoring image sequence.

The evaluating unit is configured to automatically perform a method with the following steps: sensing at least one preceding image at the time that lies shortly before the target time and/or sensing at least one following image at a time that lies shortly after the target time, and to determine which of the images sufficiently completely contains the greatest portion of a blister segment by means of image recognition, and to store said image as a monitoring image. If the advance sensing device for defining the advance had made a measuring error, this leads to no complete blister segment being recognised in the field of view, but instead only a part of it. By contrast, at an earlier or later time a greater part of the blister segment would appear in the field of view and thus in the image. By capturing a preceding image and/or a following image, it can be determined which image contains the greatest portion of the blister segment in the image. This image is more appropriate for the monitoring image than the image captured at the target time.

It is possible, and represents a preferred embodiment, that the correction to the previous blister segment is taken into account when defining the target time for the next blister segment such that no corrections are necessary when capturing the subsequent blister segment, provided that the advance sensing device has not made any measuring errors.

The feature that the time lies shortly before the target time is in particular intended to be understood to mean that a time difference between the target time and the time at which the preceding or following image is captured is less than a second, in particular less than 0.5 seconds.

It is beneficial if the blister strip inspection device has a conveying device for automatically conveying the blister strip. The conveying device comprises a coiler and a decoiler, for example, wherein the sensing device is arranged such that it can capture between the coiler and the decoiler an image of the blister strip. It is possible but not necessary for the advance sensing device or parts thereof to be a component of the conveying device. It is possible, for example, for the conveying device to convey the blister strip by means of a frictional wheel and/or a mandrel and thus sense the advance. However, the conveying device is dispensable as it is possible to move the blister strip by manually pulling it through.

It is beneficial if the conveying device comprises a coiling device which features a coiler and a drive motor for driving the coiler, wherein the drive motor is connected to the advance sensing device such that a rotational frequency of the coiler is dependent on the length of the blister strip which the advance sensing device has sensed. It is particularly beneficial if the evaluating unit is connected to the drive motor and is configured to control the drive motor. Since the coil on the coiler continually widens when coiling the blister strip, the rotational frequency with which the coiler must be rotated such that a constant advance is achieved, decreases. In other words, the blister strip inspection device is configured to automatically calculate the radius of the coil on the coiler and to drive the drive motor of the coiler such that the blister strip is movable with a constant advance.

It is also beneficial if the conveying device has a decoiler from which the blister strip is decoiled when the blister strip inspection device is in operation.

The method according to the invention is preferably performed by using a blister strip inspection device according to the invention.

Figure 2:
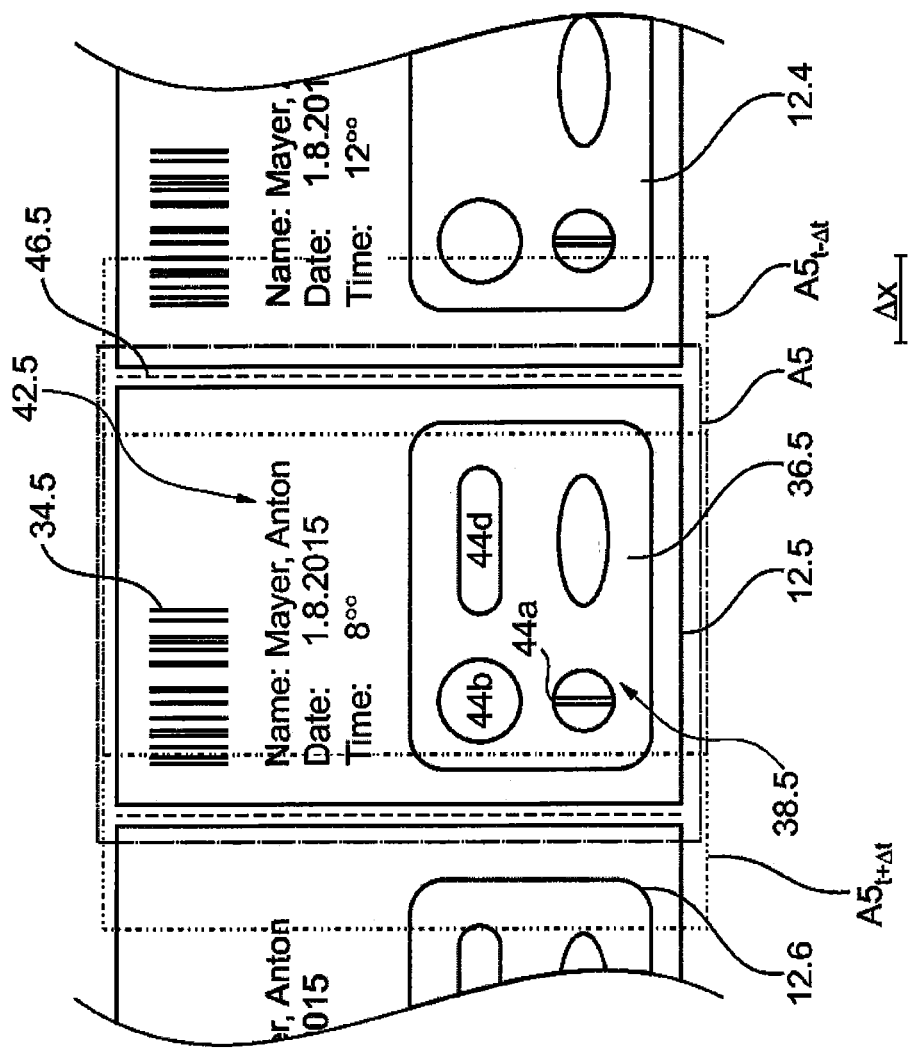

The invention is explained more clearly hereinafter with the help of the enclosed drawings. In the drawings:

FIG. 1 shows a schematic view of a blister strip inspection device according to the invention and FIG. 2 shows a blister segment as it is acquired at the target time by an image acquisition device of the blister strip inspection device.

FIG. 1 shows a blister strip inspection device 10 according to the invention for sensing blister segments 12.1, 12.2, . . . of a blister strip 14. The blister strip inspection device 10 features an image acquisition device 16 which, in the present case, comprises a first camera 18.1 and a second camera 18.2.

The first camera 18.1 features a first field of view 20.1, the second camera 18.2 features a second field of view 20.2. The blister strip inspection device 10 has a conveyor table 22 on which the blister strip 14 is conveyed. The fields of view 20.1, 20.2 overlap on the conveyor table 22.

It can be recognised that the fields of view 20.1, 20.2 are formed such that their respective lengths $L_1$, $L_2$ on the conveyor table 22 correspond to at least one blister segment length $L_{14}$. It is therefore possible for a blister segment 12 to be captured by both cameras 18.1, 18.2 at the same time.

The blister strip inspection device 10 features an advance sensing device 24 which, in the present case, has a frictional wheel 26. The frictional wheel 26 is arranged such that the blister strip 14, which glides over the conveyor table 22, rotates the frictional wheel 26 in a non-slip manner. The frictional wheel 26 is connected to a rotation angle sensing device 28, by means of which a rotation angle φ is sensed as a function of the time t.

In the present case, the advance sensing device 24 is formed such that it resolves an advance x, i.e. a movement on the conveyor table 22 along an x-axis, with an accuracy of 0.1 millimetre. If the blister strip 14 moves in the advance direction R, the advance x is continuously sensed by means of the advance sensing device 24. In other words, it is known at any given time t, with an accuracy of at least one millimetre, in the present case 0.1 millimetre, how great the advance x is and therefore the position of the blister strip 14 along the advance direction R across the conveyor table 22.

In order to keep the slippage between the blister strip 14 and the frictional wheel 26 as little as possible, the frictional wheel 26 features a slip inhibiting element 30, in the present case in the form of a rubber tyre which is particularly preferably formed contoured. The frictional engagement between the frictional wheel 26 and the blister strip 14 is thus guaranteed.

The blister strip inspection device 10 can optionally feature a positioning sensor 32 which can recognise a schematically marked label 34 of a blister segment 12 or of the blister strip 14. According to a preferred embodiment, it is envisaged, for example, that each blister strip 14 features at least one label on the basis of which the start of a sequence of blister segments is recognisable. This label encodes, for example, the start of a segment of the blister strip 14 which is intended for a particular patient. If this blister segment ends and another blister segment follows for another different patient then the blister strip 14 features a further label.

However, it is also possible that each blister segment 12.$i$, i.e. the blister segments 12.1, 12.2, 12.3, . . . , has an individual label 34 on the basis of which the contents of the blister segment can be defined. A compartment 36.1 is thus schematically marked for the blister segment 12.1 in which compartment a medicament 38.1 is contained. On the basis of the label 34.1, it can be ascertained by means of querying a database which medicament 38.1 is contained in the compartment 36.1.

If a label 34 (reference numbers without number suffixes relate to all corresponding objects) passes through the positioning transmitter 32, this thus senses the presence of the label. Since the locations of the labels 34 are known for each blister segment 12, the position of the blister segment 12 on the conveyor table 22 is thus also known. Since each location change of the blister strip 14 is determined by the advance sensing device 24, the location of each individual blister segment 12.$i$ (I=1, 2, 3, . . . ) can be defined even if the positioning sensor 32 is not supplying an evaluable signal. This can be the case, for example, if the blister tube 14 is highly reflective.

The advance sensing device 24 is connected to an evaluating unit 40. The evaluating unit 40 senses the advance x(t) of the blister strip 14 and determines at any given time t if a blister segment 12 is fully located in the field of view 20.1 and/or in the field of view 20.2. This is the case for the blister segment 12.$i$ at the target time $t_i$. At this target time $t_i$ the evaluating unit 40 triggers the cameras 18.1, 18.2 such that they each capture at least one image.

FIG. 2 schematically shows an image A5 of the blister segment 12.5 which is located in the fields of view 20.1, 20.2 of the cameras 18.1, 18.2 at the target time $t_5$. The periphery of the image A5 is drawn with a plain line.

The label 34.5 which is formed by a barcode in the present case can be recognised. It can also be recognised that the blister segment 12.5 has a written labelling 42.5 which is part of the label 34.5 and contains the name of the patient and the time of intake at which the medicament 38.5, in the present case the tablets 44$a$, 44$b$ and 44$d$, must be taken. The medicaments 38.5 are contained in the compartment 36.5.

The blister segment 12 is constructed of two film layers which are firmly connected to each other and which consist of transparent plastic such that the medicaments 38.5 are visible.

FIG. 2 shows that two adjacent blister segments, in the present case the blister segments 12.5 and 12.4, are connected to each other via a perforation 46.5 such that they can be easily separated from each other.

The image A5 is sent from the camera 18.1 to the evaluating unit 40 and is stored there. The blister strip 14 moves continuously across the conveyor table 22. If the evaluating unit 40 calculates, based on the data of the advance sensing device 24, that the following blister segment, in the present case the blister segment 12.6, is located in the field of view 20.1 of the first camera 18.1, a further image is triggered and is stored by the evaluating unit 40 such that it is understandable that immediately successive blister segments were captured. This results in an image sequence A1, A2, A3, . . . , which is stored in a tamper-proof manner in a memory of the evaluating unit such that to each blister strip 14 is unambiguously assigned the associated image sequence. The images which belong to the image sequence are described as monitoring images.

If, as is illustrated in the present embodiment, two cameras (18.1, 18.2) are present, each of the cameras takes at least one image, in particular precisely one image such that two images are stored for each blister segment.

It is possible that at least one of the cameras 18.1, 18.2 is a video camera, which captures a continuous sequence of temporally equidistant images which are cached. The evaluating unit 40 defines the times $t_i$ at which a blister segment 12.$i$ is located in the field of view of at least one of the cameras and only takes the image from the stream of images in which the image of the blister segment can be recognised. The data volume which is to be stored is thus reduced.

In rare cases, it can occur that the advance sensing device 24 can cause a measuring error. In that event, the respective blister segment 12 is not centrally captured in the respective image A but is laterally displaced thereto. FIG. 2 shows the image A5$_{t-\Delta t}$ which was captured at a time too early by Δt.

It can therefore be advantageous, without being necessary, that the evaluating unit 40 also takes at least one image from the stream of images of the at least one video camera which was captured at an earlier or later time, wherein the temporal interval Δt between temporally adjacent images is preferably so small that the blister strip 14 has covered a distance of at most 1 centimetre, for example at most 0.5 centimetre in the corresponding time period.

The evaluating unit 40 then determines the location of the respective blister segment 12.$i$ in the respective image A by means of a pattern recognition algorithm and selects the image in which the greatest possible scope of the blister segment can be recognised. This can be carried out, for example, by means of the location of the label 34 and/or the perforation 46 or another characteristic structure of the blister segment being determined and compared to a required position. The image for which this segment becomes minimal is selected and stored for documentation. In the present example, this is the image A5 and not the image $A5_{t-\Delta t}$.

The video camera thus captures, for example, the image sequence $A(t=t_0+n\Delta T)$, $(n=1, 2, 3, \ldots, \Delta T$ being the temporal image interval), wherein the image $A(t_0+n_k\Delta T)$ in this notation corresponds to the image A5 from above. The evaluating unit 40 then determines the location of the label 34.5 in the images $A(t_0+n_{k-1}\Delta T)(=A5_{t-\Delta t})$, $A(t_0+n_k\Delta T)$ $(=A5)$ and $A(t_0+n_{k+1}\Delta T)$ $(=A5_{t+\Delta t})$, wherein $(k=1, 2, 3, \ldots)$ applies. Since the label 34.5 in the image $A(t_0+n_k\Delta T)$ $(=A5)$ comes closest to the ideal location in the image, this image $Ai=A5$ which was captured at the time $t_{i=5}=t_0+n_k\Delta T$ is selected as a monitoring image and the remaining images of the blister segment 12.5 are discarded.

In other words, as well as the image Ai (here: I=5) at least one preceding image $A5_{t-\Delta t}$ is captured at a time $t_0+n_{k-1}\Delta T$ which lies by the image interval $\Delta T$ before the target time $t5=t_0+n_k\Delta T$ is acquired and a following image $A5_{t+\Delta t}$ is captured at a time $t_0+n_{k+1}\Delta T$ which lies by the image interval $\Delta T$ after the target time. It is then determined by means of image recognition which of the images sufficiently completely contains the greatest portion of the blister segment 12.*i*, and this image is stored as a monitoring image.

If it arises that the respective blister segment cannot be ideally recognised in the image, the spatial offset from the ideal position is defined by the evaluating unit 40. In other words, the evaluating unit 40 determines by which advance $\Delta x$ the respective blister segment would have to be displaced in order to be ideally situated in the respective field of view 20 of the camera. The time at which the next image is triggered is corrected by this correction such that systematic measuring errors of the advance sensing device are corrected automatically.

The blister strip inspection device 10 comprises a conveying device 47 for conveying the blister strip 14. The conveying device 47 comprises a coiling device 48 which has a coiler 50 and a schematically marked drive motor 52 which in FIG. 1 is concealed by the coiler 50. When in operation, the blister strip 14 is coiled on the coiling device 48. The blister strip inspection device 10 also features a decoiling device 54 which has a decoiler 56. It is possible but not necessary for the decoiler 56 to be driven by a motor.

The drive motor 52 is connected to the evaluating unit 40. By means of numerical integration, the evaluating unit 40 calculates from the advance $x=x(t)$ the strip length $L_{14}$ of the blister strip 14 which is already coiled on the coiler 50. A table or formula is left in the digital memory of the evaluating unit 40, from which the rotational frequency is derivable, with which the drive motor 52 must be operated such that the blister strip 14 is neither too tightly nor too loosely coiled on the coiler 50. Such a control of the rotational frequency is, however, dispensable.

Alternatively, for example, the drive motor 52 can be operated with a constant torque which is selected such that the coil is coiled neither too tightly nor too loosely on the coiler 50. As an alternative to this, a device will also be present which senses how severely the blister strip 14 sags, and which controls the rotational frequency of the drive motor 52 on the basis of the sagging of the blister strip.

It is possible that instead of from the decoiler 56 the blister strip 14 is fed directly from a blister wrapping machine. Instead of a blister strip, a blister wrapping machine which comprises an inventive blister strip inspection device is also according to the invention.

| List of reference numbers | |
|---|---|
| 10 | Blister strip inspection device |
| 12 | Blister segment |
| 14 | Blister strip |
| 16 | Image acquisition device |
| 18.1 | First camera |
| 18.2 | Second camera |
| 20.1 | Field of view |
| 20.2 | Field of view |
| 22 | Conveyor table |
| 24 | Advance sensing device |
| 26 | Frictional wheel |
| 28 | Rotation angle sensing device |
| 30 | Slip inhibiting element |
| 32 | Positioning transmitter |
| 34 | Label |
| 36 | Compartment |
| 38 | Medicament |
| 40 | Evaluating unit |
| 42 | Written labelling |
| 44a | Tablet |
| 46 | Perforation |
| 47 | Conveying device |
| 48 | Coiling device |
| 50 | Coiler |
| 52 | Drive motor |
| 54 | Decoiling device |
| 56 | Decoiler |
| A | Image |
| L | Length |
| $L_{14}$ | Strip length |
| i | Number index i = 1, 2, 3, . . . |
| R | Advance direction |
| t | Time |
| x | Advance |
| φ | Rotation angle |

The invention claimed is:

1. A blister strip inspection device for sensing blister segments of a blister strip, comprising:
   (a) an image acquisition device arranged to capture images of the blister strip, wherein the image acquisition device comprises a digital camera, wherein the digital camera is a video camera which has a field of view, and is configured to capture an image sequence consisting of temporally successive images,
   (b) an advance sensing device for continuously sensing an advance of the blister strip, and
   (c) an evaluating unit which is connected to the digital camera and to the advance sensing device which is configured to automatically perform a method having the following steps:
     (i) determine a target time at which a blister segment is completely in the field of view, at least on the basis of the advance, the target time being an optimal time for capturing images of the blister segment,
     (ii) take a first image prior to the target time, the first image including of one or more medicaments present in the pouch and an identifying label on the pouch,
     (iii) store the first image taken in step (ii),
     (iv) take a second image at the target time, the second image including of one or more medicaments present in the pouch and an identifying label on the pouch,
     (v) store the second image taken in step (iv);

(vi) take a third image after the target time, the third image including of one or more medicaments present in the pouch and an identifying label on the pouch, (vii) store the third image taken in step (vi);

wherein the evaluating unit is configured to automatically determine which of the first, second and third images sufficiently completely contains the greatest portion of a blister segment by image recognition, and store the determined image as a monitoring image.

2. The blister strip inspection device according to claim 1, wherein the advance sensing device is formed to sense the advance by image correlation.

3. The blister strip inspection device according to claim 1 further comprising a conveying device for automatically conveying the blister strip.

4. The blister strip inspection device according to claim 3, wherein the conveying device comprises a coiling device that includes a coiler and a drive motor for driving the coiler, Wherein the drive motor is connected to the advance sensing device such that a rotational frequency of the coiler is dependent on the length of the blister strip which the advance sensing device has sensed.

* * * * *